United States Patent
Shih

(10) Patent No.: US 9,020,486 B2
(45) Date of Patent: Apr. 28, 2015

(54) REAL-TIME MANAGEMENT SYSTEM FOR MOBILE ELECTRONIC DEVICES

(71) Applicant: Sheng-Yuan Shih, Taipei (TW)

(72) Inventor: Sheng-Yuan Shih, Taipei (TW)

( * ) Notice: Subject to any disclaimer, the term of this patent is extended or adjusted under 35 U.S.C. 154(b) by 0 days.

(21) Appl. No.: 14/279,331

(22) Filed: May 16, 2014

(65) Prior Publication Data

US 2014/0250539 A1 Sep. 4, 2014

Related U.S. Application Data

(63) Continuation-in-part of application No. 13/617,779, filed on Sep. 14, 2012, now abandoned.

(51) Int. Cl.
*H04M 3/00* (2006.01)
*G06F 21/62* (2013.01)
*H04W 88/02* (2009.01)

(52) U.S. Cl.
CPC .............. *G06F 21/629* (2013.01); *H04W 88/02* (2013.01)

(58) Field of Classification Search
USPC ...................... 455/418–420; 726/28; 709/208; 340/12.52
See application file for complete search history.

(56) References Cited

U.S. PATENT DOCUMENTS

| | | | |
|---|---|---|---|
| 2003/0084159 A1* | 5/2003 | Blewett | 709/226 |
| 2007/0179997 A1* | 8/2007 | Nooning | 707/204 |
| 2008/0104208 A1* | 5/2008 | Ebrom et al. | 709/220 |
| 2008/0143490 A1* | 6/2008 | Elston et al. | 340/286.02 |
| 2008/0147831 A1* | 6/2008 | Redjaian et al. | 709/222 |
| 2009/0239587 A1* | 9/2009 | Negron et al. | 455/566 |
| 2009/0327910 A1* | 12/2009 | Black et al. | 715/744 |
| 2012/0023212 A1* | 1/2012 | Roth et al. | 709/223 |
| 2012/0079119 A1* | 3/2012 | Gill et al. | 709/227 |
| 2012/0086563 A1* | 4/2012 | Arling et al. | 340/12.52 |
| 2012/0129503 A1* | 5/2012 | Lindeman et al. | 455/414.1 |
| 2012/0200400 A1* | 8/2012 | Arling et al. | 340/12.28 |
| 2012/0226764 A1* | 9/2012 | Philip et al. | 709/208 |
| 2012/0242526 A1* | 9/2012 | Perez et al. | 341/176 |
| 2012/0311322 A1* | 12/2012 | Koyun et al. | 713/156 |
| 2012/0323717 A1* | 12/2012 | Kirsch | 705/26.1 |
| 2013/0060359 A1* | 3/2013 | Kim et al. | 700/90 |
| 2014/0007048 A1* | 1/2014 | Qureshi et al. | 717/110 |

* cited by examiner

*Primary Examiner* — Nathan Taylor
(74) *Attorney, Agent, or Firm* — Leong C. Lei

(57) ABSTRACT

Disclosed are a real-time management system for mobile electronic devices and its operating method. The real-time management system includes a mobile electronic device and a main system. After a web developer's management priority of the mobile electronic device is enabled and the mobile electronic device is electrically connected to the main system, the web setting and browser setting of the mobile electronic device are duplicated to the main system to form a mapping area, and the mobile electronic device and the main system turn on a communication port as a specific channel through a web debugging mode, so that the main system and the mobile electronic device constitute a proxy server for performing real-time operations in the mapping area and displaying the operation results through a touch screen of the mobile electronic device without requiring the installation of other application programs, so as to skip the complicated setup procedure.

3 Claims, 4 Drawing Sheets

REAL-TIME MANAGEMENT SYSTEM FOR MOBILE ELECTRONIC DEVICES

CROSS-REFERENCE TO RELATED APPLICATIONS

This application is a continuation-in-part patent application of U.S. application Ser. No. 13/617,779 filed on Sep. 14, 2012, the entire contents of which are hereby incorporated by reference for which priority is claimed under 35 U.S.C. §120.

BACKGROUND OF THE INVENTION

1. Field of the Invention

The present invention relates to a real-time management system for mobile electronic devices and an operating method thereof, and more particularly to the real-time management system that access a web developer's right via a cable connection to enable a communication port, and perform a bi-directional communication through a web debugging mode, and a touch screen of the mobile electronic device is used for performing the real-time management operation and display.

2. Description of the Related Art

Mobile electronic devices such as mobile phones, tablet PCs and personal digital assistants (PDAs) are generally used for processing tasks such as managing itinerary and editing documents. As mobile networks and wireless network become more and more popular, the application of the mobile electronic devices of this sort becomes increasingly more diversified, so that we can obtain information quickly and perform real-time communication, and the mobile electronic devices are indispensable to our life.

The operating systems used in a common mobile electronic device such as the mobile phone and tablet PC are nothing more than Android and iOS. However, customized software are built in these systems to be compatible with different telecommunication companies, and these customized software should come with specially written functions for users of different telecommunication companies, but the current situation is not so. Therefore, the customized software becomes a burden of the mobile electronic device, not only occupying memory, but also occupying internal storage spaces. The mobile electronic devices of this sort usually restrict the users' operation through priority in order to prevent the users from deleting the necessary system software by accident, so that the foregoing customized software cannot be deleted in a general situation, and thus causing tremendous inconvenience to the users.

In fact, a system developer has the highest priority to perform various management tasks, so that there are different ways of obtaining the highest priority, which is called ROOT in the Android system or jail break (JB) in the iOS system. The management tasks performed after the highest priority is accessed may cause instability or damage of the system, so that the original manufacturers do not provide manufacturer's warranty to any mobile electronic device that has obtained the highest priority, since the procedure of obtaining the highest priority is relatively more complicated. For a general user, this procedure is very difficult, and may even have the risk of being unable to boot the system, so that such procedure is not commonly used by the general users.

There are risks when the mobile electronic device is carried out. In addition, most data recorded in the mobile electronic device are the data used very often. Once the mobile electronic device is lost or damaged, the whole or a part of the data may be lost. Therefore, most users use backup software to prepare a backup of the data as well as the application programs stored in the mobile electronic device. Such backup software is mainly divided into two following types: The one that stores the backup data in the mobile electronic device, and the other one that stores the backup data in a cloud space. Since the operating procedure is complicated, and no error check is provided in the backup process, therefore the backup data may not be completed and some are even damaged. Obviously, the prior art requires improvements.

SUMMARY OF THE INVENTION

Therefore, it is a primary objective of the present invention to overcome the drawbacks of the prior art by providing a real-time management system for mobile electronic devices, wherein after a user accesses a web developer's priority via a cable connection, a communication port is formed to serve as a specific channel to perform real-time communication and management tasks between the mobile electronic device and the main system without requiring any ROOT or jail break (JB), so that the highest management priority can be accessed to improve the convenience of application significantly without requiring the installation of other application programs. In addition, after the cable connection is disconnected, the mobile electronic device resumes its original condition, and thus will not incur any warranty issue.

To achieve the aforementioned and other objectives, the present invention provides a real-time management system for mobile electronic devices, comprising: a mobile electronic device including a touch screen, a first connection port, a first central processing unit and a data storage medium, and the data storage medium having an operating system and at least one web browser installed therein; and a main system, including a casing and a control circuit board, wherein the control circuit board has a second connection port, a second central processing unit, a buffer unit and a storage medium installed thereon, and the storage medium has an operating system installed therein; during operation, the mobile electronic device is electrically coupled to the main system through a signal connection line, so that the second central processing unit communicates and accesses a right with the first central processing unit through a web debugging mode, and duplicates the operating system into the buffer unit to form a proxy server, and the touch screen is provided for performing a real-time operation and displaying the management operation performed by the web browser to the proxy server.

In a preferred embodiment, the storage medium is a hard disk, a memory card or a flash drive provided for facilitating users to transfer files or expand the memory capacity, so as to improve the flexibility of the application significantly.

In addition, the real-time management system for mobile electronic devices of the present invention further comprises a power supply installed in the main system and electrically coupled to the control circuit board for supplying electric power to the main system and/or the mobile electronic device for a normal use, as well as serving as a mobile power supply for emergency use.

The present invention further provides an operating method of a real-time management system for mobile electronic devices, comprising the steps of: enabling a management priority of a web developer of the mobile electronic device; electrically coupling the mobile electronic device to the main system through a signal connection line and automatically completing a system initialization between the mobile electronic device and the main system; duplicating a web setting and a browser setting of the mobile electronic device into the main system to form a mapping area; enabling a communication port through a web debugging mode by the mobile electronic device and the main system, and specifying the communication port as a specific channel for the communication between the mobile electronic device and the main system; using the proxy server to operate a real-time operation to the mapping area through the touch screen by the main system; and displaying a successful operation result or an error message on the touch screen.

In addition, the step of electrically coupling the mobile electronic device to the main system through a signal connection line and automatically completing a system initialization between the mobile electronic device and the main system is carried out by enabling the web browser corresponding to the mobile electronic device through the main system, connecting the web browser to a specified website in the main system, automatically transmitting corresponding parameter to complete a registration by the mobile electronic device, and then immediately displaying an initial status from the web browser to complete the authentication and communication between the mobile electronic device and the main system.

DETAILED DESCRIPTION OF THE PREFERRED EMBODIMENTS

The technical content of the present invention will become apparent with the detailed description of preferred embodiments and the illustration of related drawings as follows. It is noteworthy that the preferred embodiments are provided for illustrating the present invention, but not intended for limiting the scope of the invention.

Figure 1:
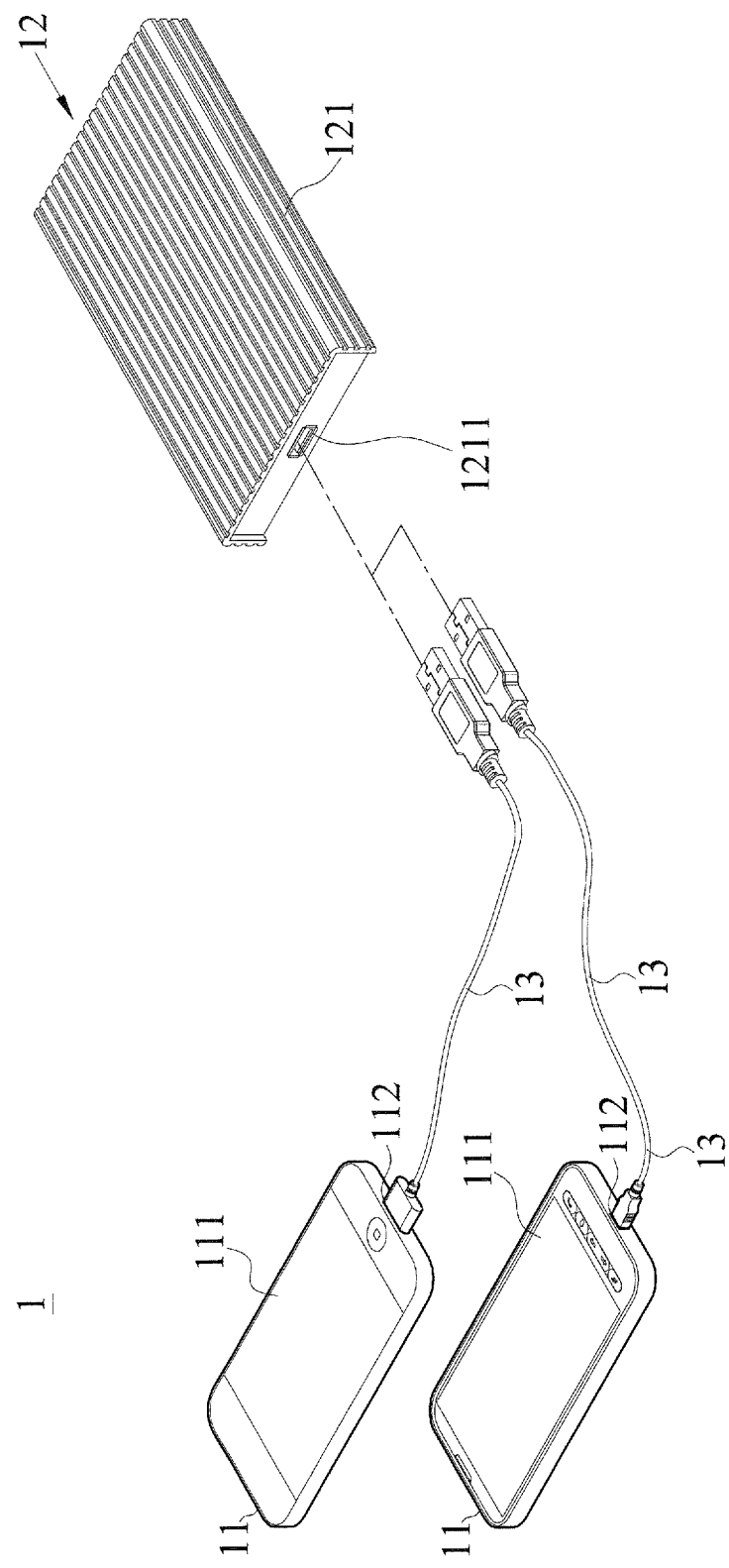
FIG. 1 is a perspective view of a preferred embodiment of the present invention.
Figure 2:
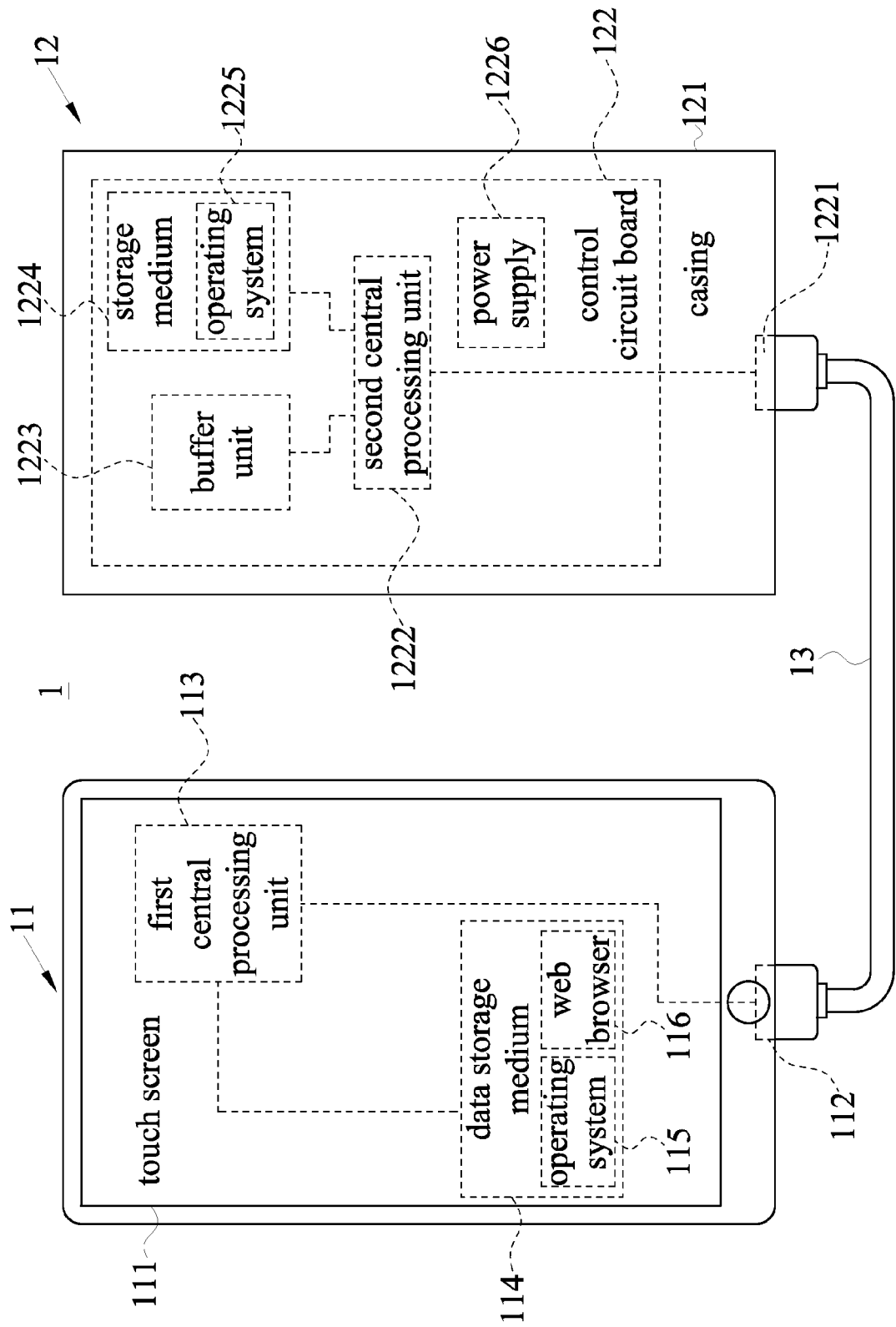
FIG. 2 is a block diagram of the hardware of a preferred embodiment of the present invention.
Figure 3:
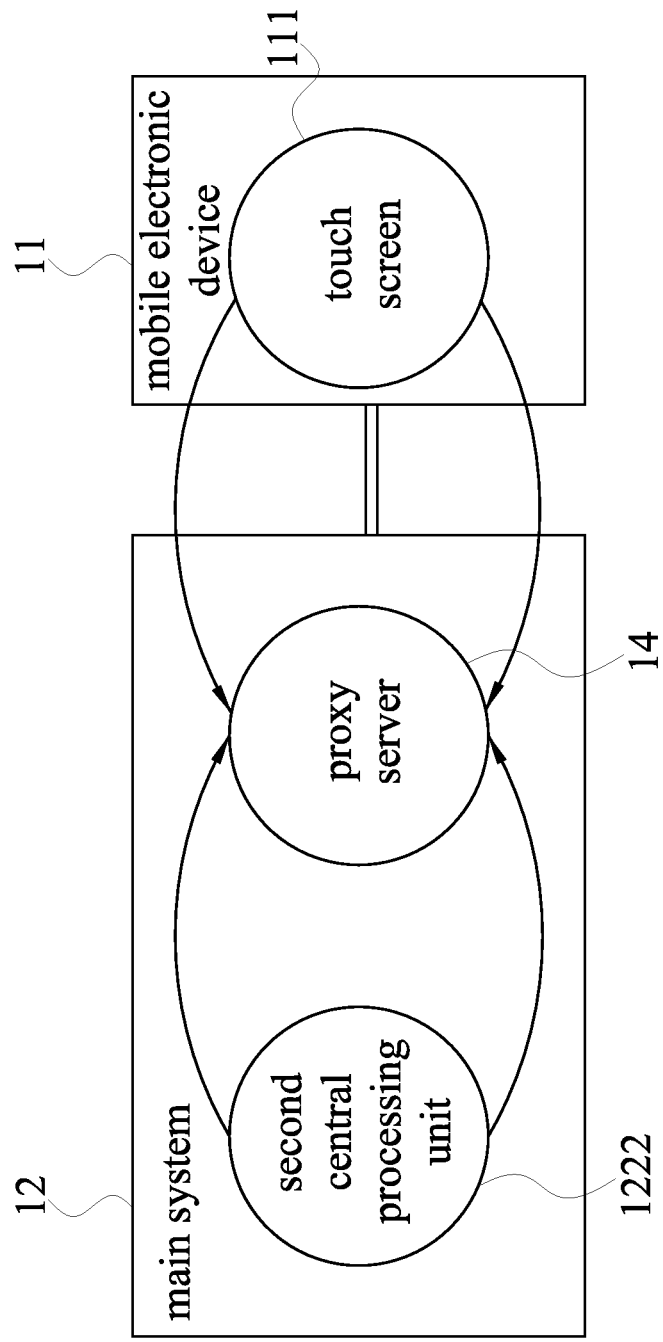
FIG. 3 is a schematic view of the operation of a preferred embodiment of the present invention.
Figure 4:
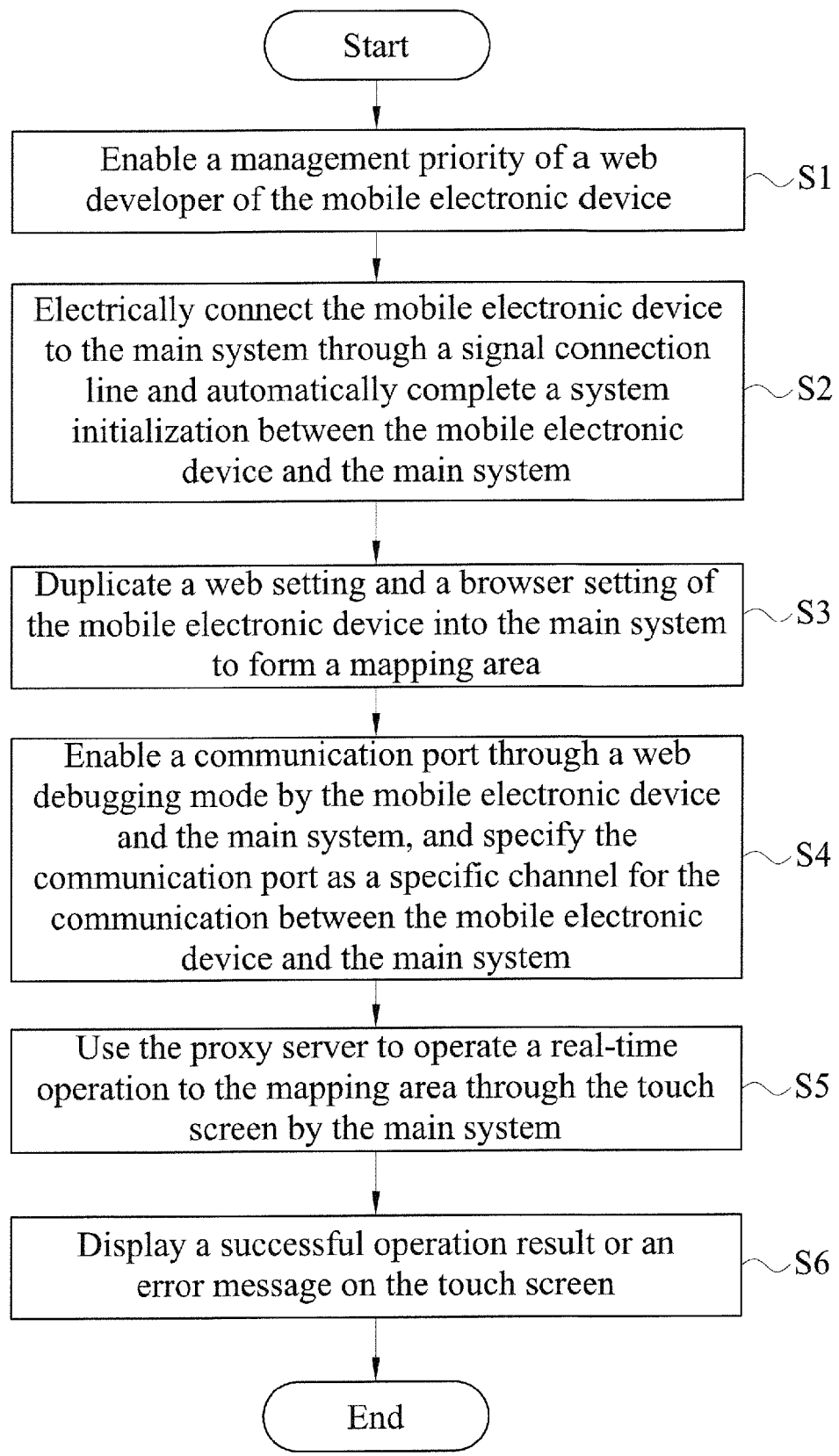
FIG. 4 is a flow chart of the operation of a preferred embodiment of the present invention.

With reference to FIGS. 1 and 2 for a perspective view and a hardware block diagram of a real-time management system for mobile electronic devices in accordance with a preferred embodiment of the present invention respectively, the real-time management system for mobile electronic devices 1 comprises a mobile electronic device 11 and a main system 12.

The mobile electronic device 11 is a mobile phone or a tablet PC and comprises a touch screen 111, a first connection port 112, a first central processing unit 113 and a data storage medium 114, and the data storage medium 114 has an operating system 115 and at least one web browser 116 such as Mobile Safari, Chrome, Firefox, etc installed therein. It is noteworthy that the touch screen 111 has both displaying and controlling functions, and the first connection port 112 comes with a different model to fit a different system and generally includes mini USB, micro USB, lightning and apple 30-pin ports provided for various types of electric connections.

The main system 12 includes a casing 121 and a control circuit board 122, wherein the control circuit board 122 has a second connection port 1221, a second central processing unit 1222, a buffer unit 1223 and a storage medium 1224 installed thereon, and the storage medium 1224 has an operating system 1225 installed therein.

During operation, the mobile electronic device 11 is electrically coupled to the main system 12 through a signal connection line 13, so that the second central processing unit 1222 can access different information of the mobile electronic device and obtain the web developer's priority 11 and communicates with the first central processing unit 113 through a web debugging mode to allow users to perform the real-time display and operation through the touch screen 111. It is noteworthy that the storage medium 1224 is a hard disk, a memory card or a flash drive, and it can be changed or removed by swapping to facilitate expanding the capacity or transmitting data.

In addition, the real-time management system for mobile electronic devices 1 further comprises a power supply 1226 installed in the main system 12 and electrically coupled to the control circuit board 122 for supplying required electric power to the main system 12 and/or the mobile electronic device 11. If the level of the electric power of the power supply 1226 is high enough, the electric power can be supplied to the mobile electronic device 11 or serves as a mobile power supply.

In addition, the operating method of the real-time management system for mobile electronic devices 1 comprises the following steps:

S1: Enable a web developer's management priority of the mobile electronic device 11. A user enables the debugging mode of the USB in the mobile electronic device such as a mobile phone to achieve the purpose of accessing the web developer's management priority.

S2: Electrically connect the mobile electronic device 11 to the main system 12 through a signal connection line, and automatically complete a system initialization between the mobile electronic device 11 and the main system 12. In the setup of the system initialization, the main system 12 enables the web browser 116 corresponding to the mobile electronic device 11 to connect the web browser to a specific website in the main system 12, and the mobile electronic device 11 automatically transmits corresponding parameters to complete a registration, and then the web browser 116 displays its initial status, so that the main system 12 can identify the model number and corresponding data of the mobile electronic device 11.

S3: Duplicate the web setting of the mobile electronic device 11 and the browser setting in the main system 12 to form a mapping area. The web setting and browser setting are duplicated to the buffer unit 1223, and then all operations corresponding to the operations of the mobile electronic device 11 are performed in the mapping area first.

S4: Enable a communication port by the mobile electronic device 11 and the main system 12 through a web debugging mode, and specify the communication port as a specified channel for the communication between the mobile electronic device 11 and the main system 12. Wherein, the specified channel is primarily used for transmitting signals of various operation instructions of the web browser 116.

S5: Use the proxy server 14 to perform different real-time operations to the mapping area through the touch screen 111 by the main system 12. Wherein, the main system 12 is combined to the touch screen of the mobile electronic device 11 to form a proxy server 14, and the present invention will not directly perform any management action of the mobile electronic device 11. Through the priority of the web developer, different management operations can be performed to the mapping area by a web debugging method via a network connection. Finally, the changed management operation in the mapping area is duplicated to the mobile electronic device 11.

S6: Display a successful operation result or an error message on the touch screen 111. Since different management operations are performed in the mapping area, therefore the operations are recorded completely and displayed on the touch screen 111 immediately. The management operation results such as analytical results can be displayed in a web result directly from the web browser 116 via a network connection. In addition, a system file with the operation results can be uploaded to a remote main system and provided as a basis for troubleshooting. In another embodiment, a reference setup value such as IP domain, subnet mask, etc can be set for the synchronization or configuration of the devices through the network connection of the web browser 116.

For backup or restoration, after the main system 12 and the mobile electronic device 11 are connected, the main system 12 sends out a message (from a specific website) to the mobile electronic device 11, so that the web browser 116 of the mobile electronic device 11 can be connected in a way similar to the network connection, and data are filled in and account password is set according to the instruction of the message. After the main system 12 obtains the information of the mobile electronic device 11, the registration procedure is completed. Now, the web browser 116 will display the instruction buttons such as the backup and restoration of the corresponding proxy server 14. After the touch screen 111 is touched to issue a control command to the second central processing unit 1222 through a console block, the second central processing unit 1222 performs a management task to the proxy server 14 in the mapping area. Finally, the result is displayed on the touch screen 111. Therefore, the main features of the present invention resides on that the web debugging method is used for a control measure during the network connection of the proxy server 14, and performing various different management tasks when the mobile electronic device 11 has not obtained the highest priority, and every management task has a result report, and thus providing a better security to users.

While the invention has been described by means of specific embodiments, numerous modifications and variations could be made thereto by those skilled in the art without departing from the scope and spirit of the invention set forth in the claims.

What is claimed is:

1. A real-time management system for mobile electronic devices, comprising:
    a mobile electronic device, including a touch screen, a first connection port, a first central processing unit and a data storage medium, and the data storage medium further having an operating system and at least one web browser installed therein; and
    a main system, including a casing and a control circuit board, wherein the control circuit board has a second connection port, a second central processing unit, a buffer unit and a storage medium installed thereon, and the storage medium has an operating system installed therein;

thereby, during operation, the mobile electronic device is electrically coupled to the main system through a signal connection line, so that the second central processing unit communicates with the first central processing unit through a web debugging mode to obtain a right to access, and duplicates the operating system of the mobile electronic device into the buffer unit to form a proxy server, and the touch screen is provided for performing a real-time operation and displaying the management operation performed by the web browser to the proxy server;
    wherein an operating method of the real-time management system for mobile electronic devices comprising the steps of:
    enabling a management priority of a web developer of the mobile electronic device;
    electrically coupling the mobile electronic device to the main system through a signal connection line and automatically completing a system initialization between the mobile electronic device and the main system;
    duplicating a web setting and a browser setting of the mobile electronic device into the main system to form a mapping area;
    enabling a communication port through a web debugging mode by the mobile electronic device and the main system, and specifying the communication port as a specific channel for the communication between the mobile electronic device and the main system;
    using the proxy server to operate a real-time operation to the mapping area through the touch screen by the main system; and
    displaying a successful operation result or an error message on the touch screen.

2. The real-time management system for mobile electronic devices according to claim 1, wherein the storage medium is one selected from the group consisting of a hard disk, a memory card and a flash drive.

3. The real-time management system for mobile electronic devices according to claim 1, wherein the step of electrically coupling the mobile electronic device to the main system through a signal connection line and automatically completing a system initialization between the mobile electronic device and the main system is carried out by enabling the web browser corresponding to the mobile electronic device through the main system, connecting the web browser to a specified website in the main system, automatically transmitting corresponding parameter to complete a registration by the mobile electronic device, and then immediately displaying an initial status from the web browser to complete the authentication and communication between the mobile electronic device and the main system.

* * * * *